United States Patent Office 3,368,834
Patented Feb. 13, 1968

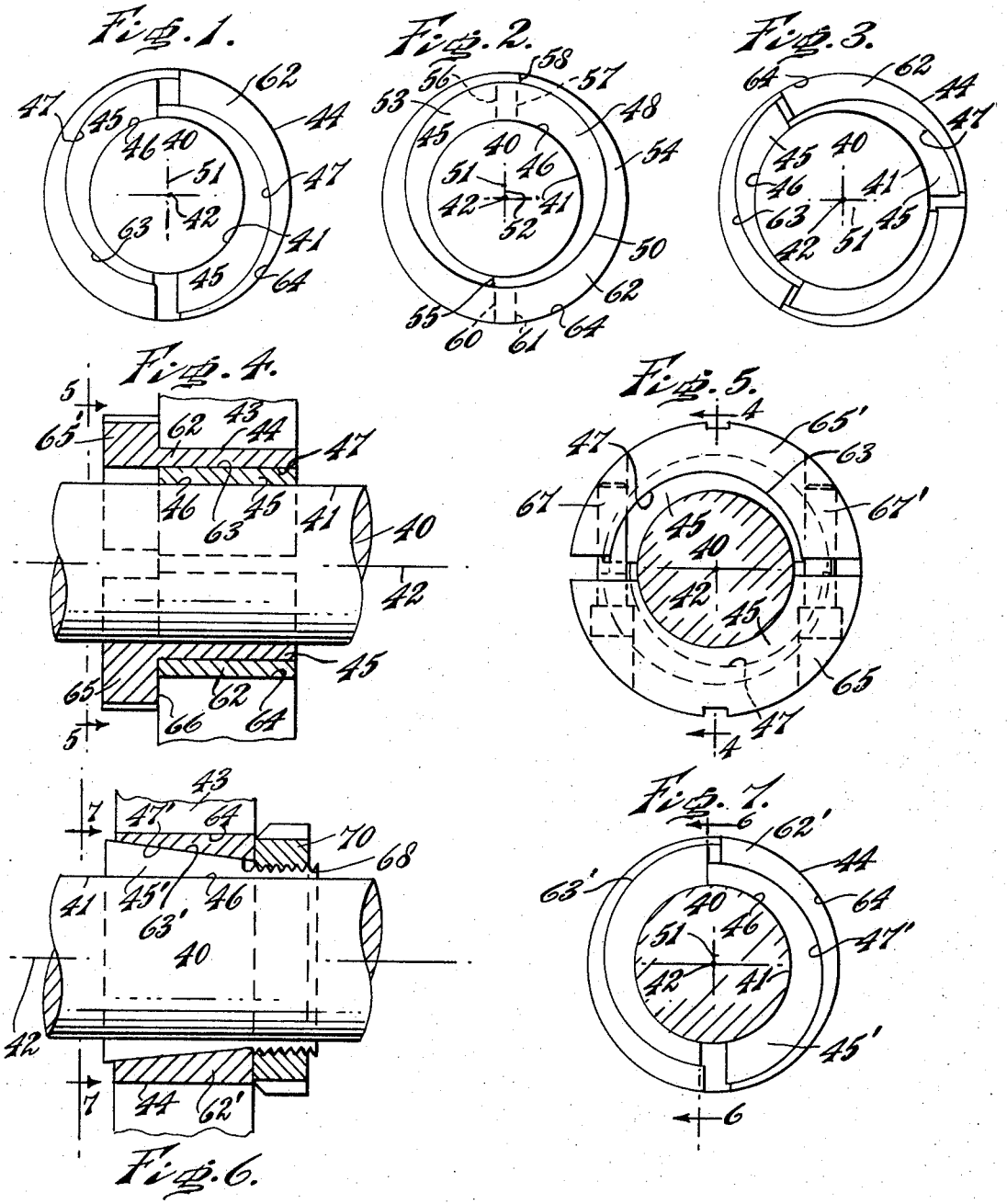

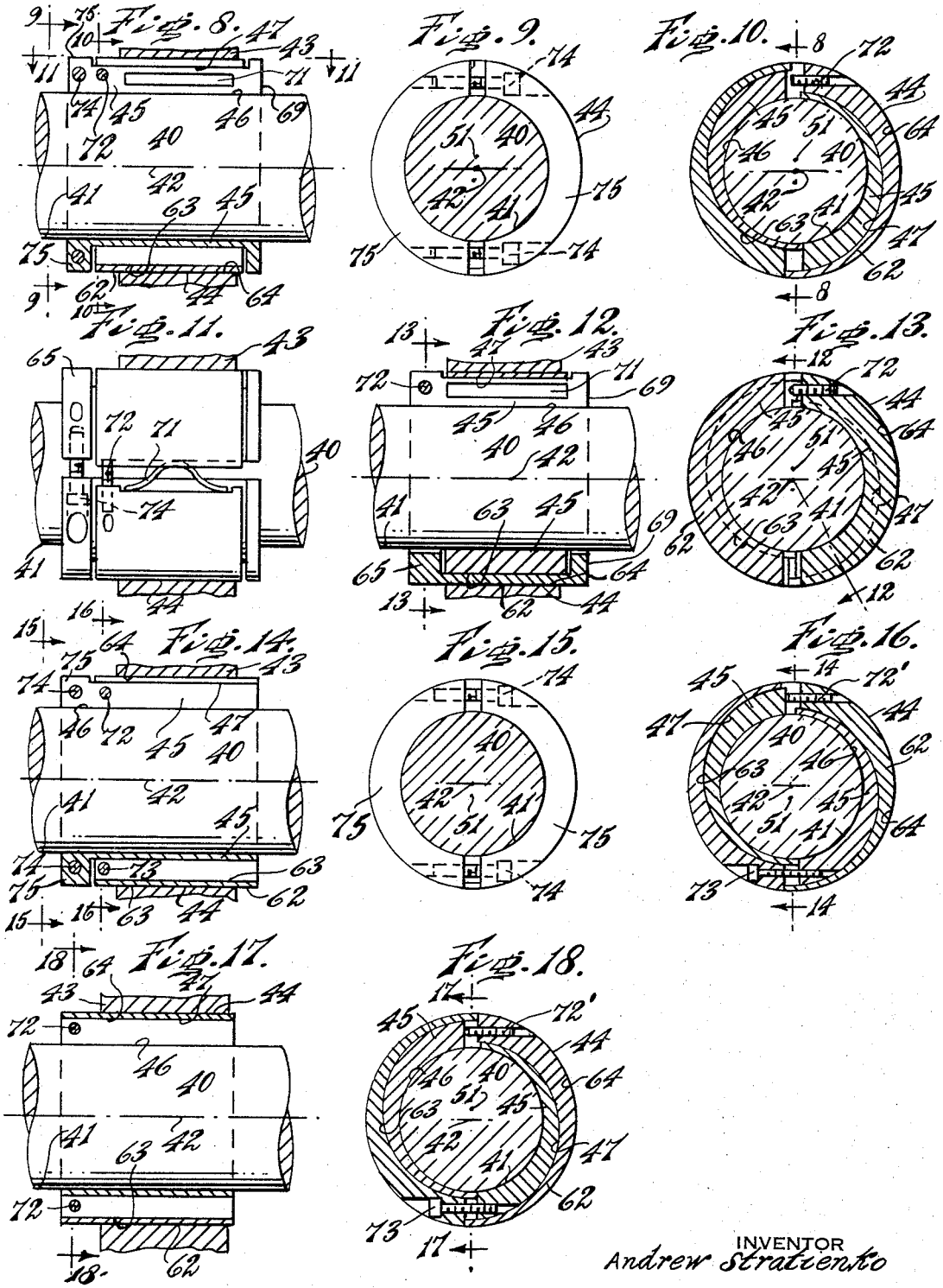

3,368,834
MECHANICAL ROTARY SELF-INTER-
LOCKING DEVICE
Andrew Stratienko, 5139 N. 15th,
Philadelphia, Pa. 19141
Continuation of application Ser. No. 204,918, June 25, 1962. This application Nov. 14, 1966, Ser. No. 594,265
4 Claims. (Cl. 287—52.09)

This application is a continuation of application Ser. No. 204,918, filed June 25, 1962, and now abandoned.

The present invention relates to a rotary self-interlocking wedge device.

When reference is made herein to the inclined wedge surfaces as being cylindrical it should be kept in mind that they are curved surfaces whose section is a circle but that they may be right cylindrical surfaces or conical surfaces.

A purpose of the invention is to provide a rotary self-interlocking wedge device, comprising a shaft member, a hub member surrounding the shaft member and having a space of annular section between the shaft member and the hub member, the members being relatively rotatable about the common axis of the shaft member and the hub member, with pairs of cooperating wedges interposed in the said annular space on the opposed sides, each pair of wedges comprising a radially inner wedge having a radially inner cylindrical surface coaxial with said common axis and cooperating with the outer cylindrical surface of said shaft member, and having a radially outer cylindrical inclined wedge surface, and comprising a radially outer wedge having a radially inner cylindrical inclined wedge surface of the same radial offset as the radially outer inclined wedge surface on the inner wedge of the pair, the inclined wedge surface of the outer wedge of each pair engaging and cooperating with the inclined wedge surface of the inner wedge of the same pair, and there being permanent anti-friction means effective on one of said inclined wedge surfaces, and the radially outer wedge of each pair having a radially outer cylindrical surface coaxial with said common axis and cooperating with the inner cylindrical surface of said hub member, each of the said pairs of wedges which have the same direction of inclination of the inclined wedge surfaces relatively tightening when rotation is in the direction toward inclination of the inclined wedge surfaces and each of said pairs of wedges which have the same direction of inclination of the inclined wedge surfaces relatively loosening when the rotation is in the direction away from the inclination of the inclined wedge surfaces, said wedge device complying with the following conditions:

$$f > \frac{1}{r_1}(a+\mu r)$$

$$f_1 > \frac{1}{r_2}(a+\mu r)$$

where $f$ is the coefficient of sliding starting friction on the coaxial cylindrical surfaces of said inner wedges,
$f_1$ is the cofficient of sliding starting friction on the coaxial cylindrical surfaces of said outer wedges
$a$ is the radial offset from the axis of the center of said cylindrical inclined wedge surfaces.

$\mu$ is the coefficient of sliding friction on said curved inclined wedge surfaces,
$r_1$ is the radius of curvature of said inner cylindrical coaxial wedge surfaces,
$r_2$ is the radius of curvature of said outer cylindrical coaxial wedge surfaces,
$r$ is the mean radius of curvature of said cylindrical inclined wedge surfaces in respect to the axis of hub rotation, whereby said wedges produce a self-interlocking action at said external and internal cylindrical coaxial surfaces in the direction of rotation toward the inclination of the inclined wedge surfaces.

A further purpose is to employ at suitable intervals around the circumference oppositely directed pairs of inner and outer wedges, so that in the direction of motion in which the wedges referred to above loosen, these oppositely directed wedges tighten, and vice versa.

A further purpose is to provide a permanent and stable sliding anti-friction means on the co-operating cylindrical inclined wedge surfaces of said wedges.

A further purpose is to provide pre-engaging means for producing limited movement of outer wedges of opposed pairs in relation to inner wedges of said opposed pairs in a direction toward the inclination of the inclined wedge surfaces for pre-tightening the wedge elements against the concentric surfaces of the hub and shaft members.

A further purpose is to provide disengagement means for producing limited relative movement of outer and inner wedges in a direction away from the inclination of the wedge surfaces for loosening of wedge elements in an annular space between hub and shaft members.

A further purpose is to provide flanges on the wedges and to produce limited relative motion of the flange connected to the outer wedge of one pair away from the flange connected to the inner wedge of the opposed pair.

A further purpose is to provide also on the wedges inclined wedge surfaces when viewed in axial section.

A further purpose is to provide positive means for moving the wedges of said pairs relatively axially to tighten or loosen.

A further purpose is to make self-interlocking wedges also self-releasing by making the device comply with the expression $a > r\mu$, the terms being as defined above.

A further purpose is to pre-engage on the cylindrical surface of the wedge in either static or dynamic wedge devices.

A further purpose is to provide spring action between the opposed wedges suitably from the outer wedge of one pair to the inner wedge of the opposed pair.

A further purpose in the case of pre-engaging and disengaging is to provide a resilient mechanism, such as a spring, to transfer motion from outer wedges to inner wedges in the direction toward or away from the direction of inclination (tightening or loosening, as the case may be).

A further purpose is to utilize the invention in rotary self-interlocking rings.

A further purpose is to provide means for disengaging the wedges as by applying force from one wedge of one pair to another wedge of another pair.

A further purpose is to utilize the invention in a manually or automatically adjusted sliding bearing.

A further purpose in a rotary self-interlocking ring is to transmit torque between the hub and the shaft which will have ability to grip and positively interlock between two smooth cylindrical surfaces without requiring machining of slots, holes, flats or other provisions for locking elements such as keys, pins, set screws or the like.

A further purpose is to provide both rotational and axial locking effect in a self-interlocking rotary thrust ring.

A further purpose in a manually adjusted sliding bearing is to lock the device to take up wear and adjust clearance between the shaft and the bearing in both directions of rotation.

A further purpose is to automatically compensate for wear in a sliding bearing.

A further purpose is to fabricate wedge elements as eccentrics and then separate them to form wedges and reverse them to apply the principles of the present invention.

A further purpose is to make either the inner or the outer wedges as the case may be, integral with or to fix them to the adjoining member, which is the shaft in the case of the inner wedges or the hub member in the case of the outer wedges, while maintaining the above relationship as far as it is appropriate to the particular device.

Further purposes appear in the specification and in the claims.

In the drawings I have chosen to illustrate a few only of the numerous embodiments, selecting the forms shown from the standpoints of convenience in illustration, satisfactory operation and clear demonstration of the principles involved.

FIGURE 1 is a diagrammatic end elevation of a device of the invention showing two reverse pairs of rotary wedges in opposed relation, the outer circle suggesting the bore of the member which is not separately illustrated.

FIGURE 2 is a diagrammatic elevation of the assemblage of components from which the reverse pairs of rotary wedges of the invention are to be made, showing the offset of the center of the eccentric surfaces which is later described.

FIGURE 3 is a view similar to FIGURE 1, showing three pairs of reverse wedges completing the circumference of the device.

FIGURE 4 is an axial section of a rotary self-interlocking ring according to the invention, the section being taken on the line 4—4 of FIGURE 5.

FIGURE 5 is an end elevation partly in transverse section on the line 5—5 of FIGURE 4, omitting the hub member.

FIGURE 6 is an axial section of a torque thrust self-interlocking ring of the invention, the section being taken on the line 6—6 of FIGURE 7.

FIGURE 7 is a transverse section of the device of FIGURE 6 on the line 7—7 of FIGURE 6 omitting the hub member.

FIGURE 8 is an axial section taken on the line 8—8 of FIGURE 10, showing an automatically adjustable sliding bearing of the invention with fixed inner wedges on the shaft.

FIGURE 9 is a section of FIGURE 8 on the line 9—9.

FIGURE 10 is a section of FIGURE 8 on the line 10—10.

FIGURE 11 is a fragmentary plan section of the device of FIGURE 8 on the line 11—11.

FIGURE 12 is an axial section of an automatically adjustable sliding bearing of the invention with the outer wedges fixed in the bore of the hub member as by an interference fit so that they are effectively integral with the hub member.

FIGURE 13 is a section on the line 13—13 of FIGURE 12.

FIGURE 14 is an axial section taken on the line 14—14 of FIGURE 16 of a manually adjustable sliding bearing according to the invention located for rotation in both ways with fixed inner wedges on the shaft which are effectively integral with the shaft from the standpoint of operation.

FIGURE 15 is a section on the line 15—15 of FIGURE 14.

FIGURE 16 is a section on the line 16—16 of FIGURE 14.

In various sections the hub member has been omitted to conserve space.

FIGURE 17 is an axial section on the line 17—17 of FIGURE 18 through a manually adjustable sliding bearing of the invention locked for rotation in both ways with wedges which are effectively fixed at the outside as due to interference fit in the bore of the hub member.

FIGURE 18 is a section on the line 18—18 of FIGURE 17.

Describing in illustration but not in limitation and referring to the drawings:

The present invention relates to opposed wedge devices which have the ability to self-interlock in one direction of rotation and which in the preferred embodiment also have the ability to self-release in some cases in the other direction of rotation.

Considering FIGURE 1 as an example, I there show a shaft 40 which is suitably a conventional shaft having a right circular cylindrical outer surface 41 and coaxial thereto an axis 42. Of course, while the shaft has been shown as a solid shaft, it may be tubular in some installations.

The shaft is surrounded in spaced relation with a hub member 43 which has an internal bore 44 coaxial with the common axis of the shaft and bore of the hub member. While this hub member has been thus generally designated, it will be evident that in many cases it will take the form of a machine part or element which is being mounted on or used in connection with the shaft, such as a gear, cam, lever, inner bearing member or the clutch member, as well known in the art.

Interposed between the hub member and the shaft in the concentric space between the two are opposed pairs of wedges. Each pair includes an inner wedge 45 which has at the radial inner surface which engages the cylindrical outer surface 41 of the shaft, an internal cylindrical surface 46 coaxial with the common axis and of the same radius of curvature as the shaft. The inner cylindrical surface 46 of the inner wedge has no special treatment to reduce its coefficient of friction, but suitably may be simply a machined surface which is engaged metal-to-metal with the outer surface of the shaft. In this case for example, where both the shaft and the wedges are of steel, the inner surface 46 will simply be a steel machined surface in the preferred embodiment. In some cases the inner surface 46 and permissibly in that case also the outer cylindrical surface 41 of the shaft may be artificially roughened as by knurling or otherwise. This, however, is ordinarily not necessary and in many cases is not desirable.

The inner wedges 45 also have radially outer cylindrical inclined surfaces 47 which are eccentric with respect to the common axis. This concept of the eccentric cylindrical inclined wedge surface at the radial outside of the inner wedge will be better understood by reference to FIGURE 2 in which the manufacture of the wedges is shown. In this instance it will be evident that the surface of the shaft 41 is surrounded by a ring 48 which has an inner surface 46 which just fits over the shaft and is cylindrical and of substantially the same diameter as the shaft.

Let us assume for the sake of understanding that the ring 48 is severed by an eccentric cut 50 of theoretically zero width which is circular as shown but is on an eccentric axis 51 which has an offset 52 from the common axis 42. Then initially the ring 48 is separated into an inner eccentric ring portion 53 and an outer eccentric ring portion 54. Now let us suppose that the inner ring portion 53 is separated by cutting it apart radially at 55 and also at a diametrically opposite position is separated by making two adjoining substantially radial cuts 56 and 57. Also the outer ring portion 54 is cut apart radially at 58 and at a diametrically opposite position is severed by two substantially radial adjoining cuts 60 and 61. Actually eccentric rings 53 and 54 will be made to fit together as shown. It will be evident then that two inner wedges 45 are formed of the character which we have just been describing and also two outer wedges 62 which will later be described. Of course, it will be evident that while this offers one means of generating the inner and outer wedges as desired for the invention, any other manner of generating wedges of similar shape can be used as will be evident to others skilled in the machining art.

The outer inclined cylindrical but offset or eccentric surface 47 of the inner wedges in the preferred embodiment of the invention will either be provided with an anti-friction surface such as an anti-friction shoe or coating. In the case of the coating, as well known, it may be a bonded layer of polytetrafluoroethylene (Teflon), a bonded layer of molybdenum sulfide, a coating as by plating with chromium, or silver, or it may have shoes of anti-friction material such as bronze, or powdered metal impregnated with suitable lubricant, such as graphite, or silver-indium, babbit, lead base alloys, or hardening the surfaces, suitably using between them a thin layer of soft material, like indium or the like. These produce permanent anti-friction means on an inclined wedge surface. Any other well known method for decreasing friction on eccentric surfaces may be employed. Returning now to the description of FIGURE 1, it will be noted that the inner wedges 45 as generated in FIGURE 2 have been reversed with respect to one another so that they will both relatively tighten and both relatively loosen in the same direction of rotation when applied to FIGURE 1.

The wedges are arranged in pairs and the outer wedges 62 have inner cylindrical eccentric wedge surfaces 63 which are of the same offset as the outer surfaces 47 on the inner wedges and which fully cooperate throughout their length with the corresponding outer surfaces on the inner wedges. This surface 63 on each outer wedge likewise in the preferred embodiment may have anti-frictional material of the character just described so that it will have a low coefficient of friction against the inner wedge surface 47. Each outer wedge at the radial outer surface has a cylindrical coaxial surface 64 which in the preferred embodiment is not of low coefficient of friction but is of the same radius of curvature and engages and cooperates with the inner right cylindrical surface 44 on the hub member. In some embodiments the outer surface of the outer wedges may be roughened as by knurling or the like and the corresponding bore of the hub member may similarly be roughened though for example where the hub member and also the outer wedge are of steel, ordinary steel on steel engagement without roughening will in normal operation produce a sufficiently high coefficient of friction as later explained.

Reference has been made in various places to the pairs of wedges being opposed. This does not necessarily mean that one pair of wedges must be diametrically opposite to another pair of wedges but it does mean that they must be opposite and cooperate. Thus in FIGURE 3 three pairs of wedges divide the circumference and each pair of wedges is opposed by two opposite pairs of wedges in this case.

The invention is particularly concerned with the ability of the device to self-interlock and in certain cases, the ability of the wedge device to self-release.

Considering the device of FIGURE 1, in the best embodiment of the invention, the following relations will exist for self-interlocking:

$$f > \frac{1}{r_1}(a + \mu r)$$

$$f_1 > \frac{1}{r_2}(a + \mu r)$$

where $f$ is the coefficient of sliding starting friction on the coaxial cylindrical surfaces of said inner wedges,
$f_1$ is the coefficient of sliding starting friction on the coaxial cylindrical surfaces of said outer wedges,
$a$ is the radial offset from the axis of the center of said cylindrical inclined wedge surfaces,
$\mu$ is the coefficient of friction on said cylindrical inclined wedge surfaces,
$r_1$ is the radius of curvature of said inner cylindrical coaxial wedge surfaces,
$r_2$ is the radius of curvature of said outer cylindrical coaxial wedge surfaces,
$r$ is the radius of curvature of said cylindrical inclined wedge surfaces in respect to the common axis of rotation.

This device will give a self-interlocking action on the inside as shown by the first expression above and a self-interlocking action on the outside as shown by the second expression above.

The device will also self-release when a larger amount of radial offset $a$ is used in inches than the product of the coefficient of starting friction on the inclined surface $\mu$ multiplied by the radius of the inclined wedge surface in inches $r$.

Because of the considerations of stress and strain, it is desirable to use the highest possible amount of radial offset $a$ within the limits for the condition of self-interlocking.

The ratio between the amount of radial offset $a$ and the product $\mu r$ creates a factor of safety of self-releasing.

The ratio between the coefficient of starting friction, and the product $$\frac{1}{r_1} \times (a + \mu r)$$

creates a factor of reliability for self-interlocking and this determines the dependability of self-interlocking. It will be evident that the use of a device in which there is an extremely low coefficient of starting friction $\mu$ on the inclined wedge surfaces is very important. The expedients as mentioned above for reducing this starting friction are desirable.

In self-interlocking rings which do not have appreciable relative movement between the parts and are therefore more nearly static, the concentric cylindrical surfaces are not subjected to pronounced wear. In such devices the frictional coefficient on the concentric surfaces $f$ and the radial offset $a$ is limited by other conditions.

The invention will be better understood by reference to the remaining figures of the drawings.

FIGURES 4 and 5 show the invention applied to a rotary self-interlocking ring. The inner wedge of one pair has a semi-cylindrical flange 65 applied to it beyond the hub member 43 so as to form a shoulder 66, retaining the hub member axially. The outer wedge of the opposite pair has a similar semi-cylindrical flange 65' which fills the rest of the circumference. This provides pre-engaging and disengaging features as applied to a rotary self-interlocking ring, because the flange half 65 from the inner wedge of one pair is interconnected to the flange half 65' of the outer wedge of the opposed pair by pre-engaging bolt 67 connecting the opposite flange halves at one side.

Before further discussing the structure of FIGURE 5, it may be helpful to understand pre-engagement and disengagement more fully.

The function of the pre-engagement feature is to produce limited movement of the outer wedges of the opposed pairs in relation to the inner wedges of the opposed pairs in the direction toward the inclination of the inclined wedge surfaces (that is the direction of tightening) for pre-tightening the wedge elements in the annular space between hub member and the shaft member.

The function of the disengagement feature is to cause limited movement of all outer wedges of the opposed pairs in relation to all inner wedges of the opposed pairs in the direction away from the inclination of the inclined surfaces to permit loosening of the wedge elements in the annular space between the hub member and the shaft member.

The function of pre-engagement in rotary devices is achieved by spreading apart (moving away) the thick ends of the outer wedges and the thick ends of the inner wedges of adjacent pairs, by using rigid expandible members between the thick end of the outer wedge of the one pair and the thick end of the inner wedge of the other pair, as is done by the jackscrew 72' in FIGURES 16 and 18, later to be described, or as is done by springs 71 in FIGURES 8 and 11 later to be described. The same purpose is achieved by tightening together (moving toward one another) the thin ends of the outer and inner wedges of the adjacent pairs using rigid or resilient pretightening means interconnecting the thin end of the outer wedge of the first pair and the thin end of the inner wedge of the last pair as has been just described, by means of pre-tightening bolt 67 of FIGURE 5.

With this general discussion of the functioning of pre-engaging and disengaging, we can now turn to the further discussion of FIGURE 5. The function of disengagement (which is used for rotary self-interlocking collars which do not have the propertly of self-releasing) is achieved by spreading apart the thin ends of the outer wedges and the thin ends of the inner wedges of adjacent pairs opposite to pre-engaging.

The same purpose is achieved by moving toward one another the thick end of the outer wedge and the thick end of the inner wedge of each adjacent pair by means of the pre-engaging bolt 67' in FIGURE 5 which really functions as a disengaging screw. Like screw 67, screw 67' extends across tangentially from one flange half 65 to the opposite flange half 65' as they are shown.

In rotary-trust rings the function of pre-engaging and disengaging is achieved by an axial taper and by the pre-engaging nut 70 later to be described in connection with FIGURE 6, and which achieves the same purpose as above mentioned.

FIGURES 6 and 7 show inner and outer wedges 45' and 62' which have wedge-like engaging surfaces as viewed transverse to the axis in FIGURE 7 and also wedge-like surface engaged with one another when viewed axially in FIGURE 6. Thus the cooperating surfaces in this instance are designated as 47' and 63', and they meet the requirements of surfaces 47 and 63 as already described and also cooperate axially as wedges as shown in FIGURE 6. To obtain the pre-engaging and disengaging in this case, the inner wedge elements have external semi-cylindrical threads 68 concentric with the axis and these cooperate to receive a nut 70 which when screwed up urges the outside wedges 62' axially to tighten and which when loosened, permits these wedges to loosen. This device is described as a torque thrust ring.

In the case of the self-interlocking rings of FIGURES 6 and 7, the axial taper on the eccentric surface of the wedge has two functions. One function is to retain axial thrust and the angle of inclination as viewed axially should be selected in accordance with the principles of linear self-interlocking as disclosed in by copending application Ser. No. 197,770, filed May 25, 1962, for Linear Self Interlocking Wedge Device, now abandoned. The second function is to enable the wedges to pretighten in the annular space between the inner and outer member by means of the special pretightening nut which surrounds the internal member and accomplishes pre-engagement. In this case, the angle of axial inclination may or may not be selected according to the principle of linear self-interlocking or self-releasing, depending upon the particular conditions, and may be chosen merely to pre-engage and disengage.

The combination of left hand assembly with right hand self-interlocking collars in the same installation is possible for transmitting torque or retaining thrust in both directions. This is possible for both rotary rings and also for thrust torque rings.

Rotary wedges can also be pre-tightened using screw or other suitable means installed in or supported against any part, which may be fixed on the driving or driven member of the machine as required.

The device of FIGURES 8 to 11 may conveniently be used as an automatically adjustable sliding bearing with inner fixed wedges. The inner wedges in this device are effectively integral with the shaft and could actually be made so if desired.

In automatically adjusting sliding bearings, leaf springs 71 act to adjust the clearance. Suitable pretightening screws 74 act between the flange halves 75 from the inner wedges of the opposite pairs for pre-tightening inner wedges on the shaft. At one end the high end inner wedge is limited in its movement towards the large end of the opposite outer wedge by screw 72 which acts similarly to the pre-engaging screw previously described, but has the function of limiting and controlling clearance between the overrunning concentric surfaces and also suitably compensating for wear. Setscrew 72 controls clearance between wedge elements for achieving stability of the hub member in relation to the shaft when overrunning.

In the device of FIGURES 8 to 11 and similarly in other devices later to be described, to limit axial relative motion of the wedges axial flange halves 69 are provided at the opposite axial ends of the members having the flange halves 75.

Automatically adjustable sliding bearings of FIGURES 8 to 11 or of FIGURES 12 and 13 have radial offset $a$ and the frictional coefficients on the eccentric and concentric surfaces of the wedges are chosen with certain objectives in view. Where the bearing operates in a direction tending to tighten the wedges, the wedges are designed with a large amount of radial offset to prevent self interlocking action and the pre-engaging spring 71 is sufficiently stiff to withstand self-releasing and loosening of wedges due to radial load on the bearings. Automatic compensation of bearing clearance is accomplished by frictional drag on the sliding surfaces.

In case the bearing operates in a direction which tends to loosen the wedges, spring force automatically compensates for bearing clearance, the wedges and the spring in this case being designed to withstand frictional drag on the concentric sliding surfaces of the device, and the device may be designed as desired so that it either will be or will not be self-interlocking or self-releasing. The adjustable jackscrew 72 is then used to adjust and to limit maximum clearance in the case where the frictional drag exceeds the spring force. In this case the bearing also may operate without the spring used for the automatic compensation of bearing clearance. Bearing clearance may be controlled in this instance and compensation for wear may take place by means of the setscrew 72. The setscrew 72 may also be used where desired to re-adjust the spring force to suit operating conditions.

FIGURES 12 and 13 show a construction for an automatically adjustable bearing with the outer wedges fixed in the bore 44 of the hub member by an interference fit as will be seen in FIGURE 13 where the outer wedges engage one another end to end. The shaft 40, therefore, comprises the overrunning member in this case.

Jackscrew 72 limits the range of motion of one of the internal wedges with respect to an opposed external wedge and therefore controls the extent of relaxation of the internal wedge when the clutch is overrunning. To provide pre-engaging of the wedges, spring 71 is used.

It will be noted in FIGRES 12 and 13 that flange halves appear at both axial ends of the device and limit axial movement, and the flange halves in one case extend from the inner wedge and in the other case extend from the outer wedge as will be evident from FIGURE 12.

FIGURES 14, 15 and 16 illustrate a manually adjusting sliding bearing positively locked for two directions of rotation and fixed with respect to the shaft. For decreasing the clearance in the sliding area of the bearings, the wedges must be unlocked by loosening attraction cap screw 73 which interconnects the large end of one outer wedge to the large end of the opposite inner wedge. Additionally, one must engage the wedges to the required extent by tightening jack set screw 72′. This jackscrew 72′ functions as a pre-engaging screw rather than limiting the range of motion as in the case of FIGURES 10 and 13 which supports the thick ends of an opposite outer wedge against an opposed inner wedge. For increasing the clearance in the sliding area of the bearing, the wedges must be unlocked by loosening the jackscrew 72′ and they must be disengaged to the desired extent by tightening attraction cap screw 73. To have the bearing positively locked in both directions of rotation both the attraction cap screw 73 and the jackscrew 72′ must be tightened one against another to eliminate the effect of tightening or loosening of wedges during operation.

In the form of FIGURES 14, 15 and 16, the fixation of the inner wedges on the shaft is accomplished by cap screws 74 which connect opposed flanges 75 which in this case both come from inner wedges so that the inner wedges can be made to hug the shaft tightly.

Whereas the form of FIGURES 14, 15 and 16 is fixed on the shaft, the form of FIGURES 17 and 18 is similar but it is fixed in the bore 44 of the hub member 43. This is a manually adjustable sliding bearing locked for both directions of rotation. The fixation of the wedges in the bore 44 of the hub member 43 is accomplished by an interference fit since the outer wedges engage one another end to end as shown in this form.

It will be evident that the self-interlocking devices of the invention are built in such a way that the locking ability of the device is produced by torque transmitted through the same device and the locking capacity is proportional to the transmitted torque and always exceeds the transmitted torque. Therefore, the torque capacity of the device is limited only by the strength of the parts and is not limited by the gripping ability of the self-interlocking surfaces.

In operation of all of the devices previously described, it will be evident that where the inner and outer wedges are not locked, they will provide self-interlocking in one direction of rotation and will in at least some of the cases self-release in the other direction of rotation. By predetermining the position, the wedges can be made to pre-engage one of the members. By controlling the limits of relative motion of the wedges, they can be made to form bearings, however, which may not be self-interlocking in either direction as previously explained.

*Example 1*

In this example, using the construction of FIGURES 4 and 5, a polytetrafluoroethylene (Teflon) coating was applied on the eccentric wedge surfaces and it gave a coefficient of starting friction of 0.04 to 0.05. This device was tested and it gave successful performance with both self-interlocking and self-releasing. The data and the calibration are as follows:

$f$ equals coefficient of sliding-starting friction between the shaft and the concentric wedge surfaces equals 0.3,
$r_1$ equals radius of the shaft equals 0.375 inch,
$a$ equals amount of radial offset of eccentric wedge surfaces equals 0.045 inch,
$\mu$ equals starting coefficient of sliding friction on eccentric wedge surfaces equals 0.05,
$r$ equals radius of eccentric wedge surfaces equal 0.451, $$0.3 > \frac{1}{0.375} \times (0.045 + 0.05 \times 0.451) = 0.181$$

This proves the condition for self-interlocking as set forth above.

The condition for self-releasing is also present since $a$ is greater than $\mu r$.

$$.045 > 0.05 \times 0.451 = 0.0225$$

The safety factor for self-interlocking is $$d = \frac{f}{\frac{1}{r_1}(a+\mu r)} + \frac{0.3}{0.181} = 1.65$$

The safety factor for self-releasing is $$d_1 = \frac{a}{\mu r} = \frac{0.045}{0.0225} = 2$$

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letter Patent is:

1. A rotary self-interlocking wedge device, comprising a shaft member, a hub member surrounding the shaft member and having a space of annular section between the shaft member and the hub member, the members being relatively angularly movable about a common axis of the shaft member and the hub member, pairs of cooperating wedges between the shaft member and the hub member on opposite sides, each pair of wedges comprising a radially inner wedge having a radially inner cylindrical surface coaxial with said common axis and cooperating with the outer cylindrical surface of said shaft member, and having a radially outer curved inclined wedge surface whose section is circular and which is eccentric with respect to the axis, and comprising a radially outer wedge having a radially inner curved inclined wedge surface whose section is circular and which is eccentric with respect to the axis and of the same radial offset as the radially outer inclined wedge surface of the inner wedge of the pair, the inclined wedge surface of the outer wedge of each pair being in sliding frictional engagement with the inclined wedge surface of the inner wedge of the same pair, there being permanent antifriction means on at least one of the inclined wedge surfaces which are in sliding engagement, and the radially outer wedge of each pair having a radially outer cylindrical surface coaxial with said common axis and cooperating with the inner cylindrical surface of said hub member, each of said pairs of wedges which have the same direction of inclination of the inclined surfaces relatively tightening when rotation is in the direction toward inclination of the inclined wedge surfaces and each of said pairs of wedges which have said same direction of inclination of the inclined wedge surfaces relatively loosening when the rotation is in the direction away from the inclination of the inclined wedge surfaces, said wedge device complying with the following conditions:

$$f > \frac{1}{r_1}(a+\mu r)$$

$$f_1 > \frac{1}{r_2}(a+\mu r)$$

where
$f$ is the coefficient of sliding starting friction on the coaxial cylindrical surface of said inner wedges,
$f_1$ is the coefficient of sliding starting friction on the coaxial cylindrical surfaces of said outer wedges, $a$ is the radial offset from the axis of the center of said curved inclined wedge surfaces which are eccentric to the axis, $\mu$ is the coefficient of sliding friction on said curved inclined wedge surfaces which are eccentric to the axis, $r_1$ is the radius of curvature of said inner cylindrical coaxial wedge surface, $r_2$ is the radius of curvature of said outer cylindrical coaxial wedge surface, $r$ is the mean radius of curvature of said cylindrical inclined wedge surfaces which are eccentric with respect to the axis of hub rotation, and positive pre-engaging means for producing limited relative motion of the outer and inner wedges in a direction toward inclination of the inclined wedge surfaces (tightening) for engaging and pre-tightening of the wedge elements against the concentric surface on the hub member, and the concentric surface of the shaft member, whereby said wedges produce a self-interlocking action at said external and internal cylindrical coaxial surfaces in the direction toward the inclination of the inclined wedge surfaces, which is also self-releasing and complies with the following condition:

$$a > r\mu$$

said wedges of each pair also have inclined wedge surfaces when viewed in axial section.

2. A wedge device of claim 1, in combination with positive rigid means used for pre-engagement to produce axial relative limited motion on the inclined surfaces for tightening the wedges.

3. A rotary self-interlocking wedge device, comprising a shaft member, a hub member surrounding the shaft member and having a space of annular section between the shaft member and the hub member, the members being relatively angularly movable about a common axis of the shaft member and the hub member, pairs of co-operating wedges between the shaft member and the hub member on opposite sides, each pair of wedges comprising a radially inner wedge having a radially inner cylindrical surface coaxial with said common axis and cooperating with the outer cylindrical surface of said shaft member, and having a radially outer curved inclined wedge surface whose section is circular and which is eccentric with respect to the axis, and comprising a radially outer wedge having a radially inner curved inclined wedge surface whose section is circular and which is eccentric with respect to the axis and of the same radial offset as the radially outer inclined wedge surface of the inner wedge of the pair, the inclined wedge surface of the outer wedge of each pair being in sliding frictional engagement with the inclined wedge surface of the inner wedge of the same pair, there being permanent anti-friction means on at least one of the inclined wedge surfaces which are in sliding engagement, and the radially outer wedge of each pair having a radially outer cylindrical surface coaxial with said common axis and cooperating with the inner cylindrical surface of said hub member, each of said pairs of wedges having the same direction of inclination of the inclined surfaces relatively tightening when rotation is in the direction toward inclination of the inclined wedge surfaces and each of said pairs of wedges which have said same direction of inclination of the inclined wedge surfaces relatively loosening when the rotation is in the direction away from the inclination of the inclined wedge surfaces, said wedge device complying with the following conditions:

$$f > \frac{1}{r_1}(a + \mu r)$$

$$f_1 > \frac{1}{r_2}(a + \mu r)$$

where $f$ is the coefficient of sliding starting friction on the coaxial cylindrical surface of said inner wedges, $f_1$ is the coefficient of sliding starting friction on the coaxial cylindrical surfaces of said outer wedges, $a$ is the radial offset from the axis of the center of said curved inclined wedge surfaces which are eccentric to the axis, $\mu$ is the coefficient of sliding friction on said curved inclined wedge surfaces which are eccentric to the axis, $r_1$ is the radius of curvature of said inner cylindrical coaxial wedge surfaces, $r_2$ is the radius of curvature of said outer cylindrical coaxial wedge surface, $r$ is the mean radius of curvature of said cylindrical inclined wedge surfaces which are eccentric with respect to the axis of hub rotation, and positive pre-engaging means for producing limited relative motion of the outer and inner wedges in a direction toward inclination of the inclined wedge surfaces (tightening) for engaging and pre-tightening of the wedge elements against the concentric surface on the hub member, and the concentric surface of the shaft member, whereby said wedges produce a self-interlocking action at said external and internal cylindrical coaxial surfaces in the direction toward the inclination of the inclined wedge surfaces, in which said wedges of each pair also have inclined wedge surfaces when viewed in axial section.

4. A rotary self-interlocking wedge device, comprising a shaft member; a hub member surrounding the shaft member and having a space of annular section between the shaft member and the hub member, the members being relatively angularly movable about a common axis of the shaft member and the hub member, pairs of co-operating wedges between the shaft member and the hub member on opposite sides, each pair of wedges comprising a radially inner wedge having a radially inner cylindrical surface coaxial with said common axis and cooperating with the outer cylindrical surface of said shaft member, and having a radially outer curved inclined wedge surface whose section is circular and which is eccentric with respect to the axis, and comprising a radially outer wedge having a radially inner curved inclined wedge surface whose section is circular and which is eccentric with respect to the axis and of the same radial offset as the radially outer inclined wedge surface of the inner wedge of the pair, the inclined wedge surface of the outer wedge of each pair being in sliding frictional engagement with the inclined wedge surface of the inner wedge of the same pair, there being permanent anti-friction means on at least one of the inclined wedge surfaces which are in sliding engagement, and the radially outer wedge of each pair having a radially outer cylindrical surface coaxial with said common axis and cooperating with the inner cylindrical surface of said hub member, each of said pairs of wedges having the same direction of inclination of the inclined surfaces relatively tightening when rotation is in the direction toward inclination of the inclined wedge surfaces and each of said pairs of wedges which have said same direction of inclination of the inclined wedge surfaces relatively loosening when the rotation is in the direction away from the inclination of the inclined wedge surfaces, and positive pre-engaging means for producing limited relative motion of the outer and inner wedges in a direction toward inclination of the inclined wedge surfaces (tightening) for engaging and pre-tightening of the wedge elements against the concentric surface on the hub member, and the concentric surface of the shaft member, whereby said wedges produce a self-interlocking action at said external and internal cylindrical coaxial surfaces in the direction toward the inclination of the inclined wedge surfaces, said inclined wedge surface of each wedge of each pair also being inclined when viewed in axial section.

References Cited
UNITED STATES PATENTS
| | | | |
|---|---|---|---|
| 431,446 | 7/1890 | Dana | 192—41 |
| 1,237,950 | 8/1917 | Phillips | 287—52.09 |
| 2,150,715 | 3/1939 | De Falco | 192—45.1 |
| 2,213,919 | 9/1940 | Michon. | |
| 2,470,179 | 5/1949 | McClosky | 287—52.06 |
| 2,554,348 | 5/1951 | Rudolph | 287—52.06 |
| 2,785,782 | 3/1957 | Dodge | 192—45.1 |
| 3,107,764 | 10/1963 | Fulton | 192—41 |

FOREIGN PATENTS
| | | |
|---|---|---|
| 58,276 | 12/1940 | Denmark. |
| 891,794 | 12/1943 | France. |
| 1,088,396 | 9/1954 | France. |
| 293,122 | 7/1928 | Great Britain. |

CARL W. TOMLIN, *Primary Examiner.*

ANDREW KUNDRAT, *Assistant Examiner.*